Oct. 8, 1968  Z. SZEPESI  3,405,276
IMAGE INTENSIFIER COMPRISING PERFORATED GLASS SUBSTRATE AND
METHOD OF MAKING SAME
Filed Jan. 26, 1965

INVENTOR.
ZOLTAN SZEPESI
BY
Lawrence S. Epstein
ATTORNEYS

United States Patent Office 3,405,276
Patented Oct. 8, 1968

3,405,276
IMAGE INTENSIFIER COMPRISING PERFORATED GLASS SUBSTRATE AND METHOD OF MAKING SAME
Zoltan Szepesi, Elmira, N.Y., assignor, by mesne assignments, to the United States of America as represented by the Secretary of the Navy
Filed Jan. 26, 1965, Ser. No. 428,262
6 Claims. (Cl. 250—213)

ABSTRACT OF THE DISCLOSURE

A solid state image intensifier and light amplifier comprising an array of photoconductive elements arranged on one side of a perforated glass sheet and an array of electroluminescent elements arranged on the opposite side, individual pairs of the photoconductive and electroluminescent elements being connected by conductive material.

---

This invention relates to solid state image intensifiers and particularly to the application of light and image intensifiication techniques for use in various optical systems.

Image intensification is not a new field and a commonly used type in theoretical considerations is the "sandwich" type where the photocurrent goes through the volume of the photoconductor material. While simple to construct, the sensitivity is lower and the response in volume conduction is slower. Another problem of the sandwich type resides in the difficulty of obtaining the necessary high capacitance ratio of the electroluminescent layer to the photoconductive layer. Another form of image intensifier includes the ridged photoconductor type intensifier construction. However, none of these provided the optimum characteristics. But with the use of a Fotoform glass plate, having a mosaic of regularly spaced holes, many problems existent in the prior art have been simplified. "Fotoform" glass is a trade name of a glass prepared by the Corning Glass Works, Electrical Products Division, located in Corning, N.Y. Fotoform glass used in the invention and referred to herein darkens after exposure to ultraviolet energy. It can be made sufficiently opaque to function as a light shield. It has a high lithium content. The term "Fotoform" is a trademark and is used hereinafter to designate a glass having the above described qualities.

It is a principal object of the invention to provide an image intensifier structure whereby the output brightness for an image is higher than the input light intensity.

It is another object to obtain the desired light intensification by providing a photoconductive mosaic layer and an electroluminescent mosaic layer separated from each other by an insulating member.

It is still another object to use evaporated photoconductors using lateral conduction through the provision of appropriate electrode patterns.

It is still another object to utilize a glass plate of selected material to provide an ideal substrate for the construction of solid state image intensifiers.

It is yet another object to utilize an image intensifier panel of glass plate with a mosaic of regularly spaced holes whereby a photoconductor cell is on one side and a corresponding electroluminescent cell is on the other side, these cells being interconnected in series through the holes.

And it is still another object to use an opaque glass plate of selected material whereby no other means will be required in order to eliminate light feedback.

Figure 1:
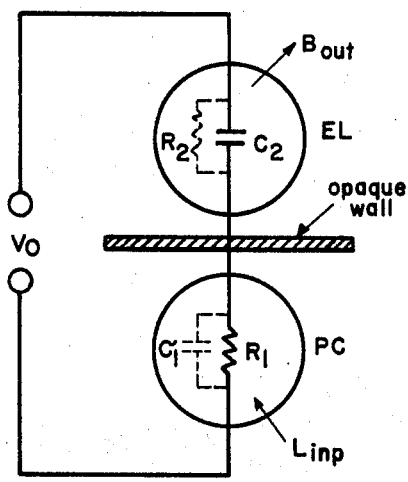
Figure 4:
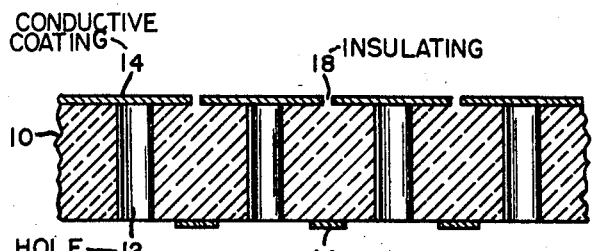
Figure 6:
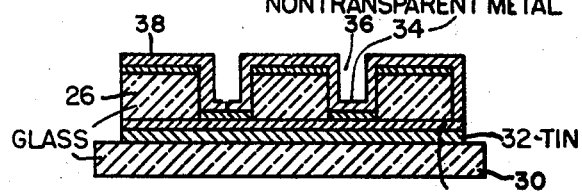
Figure 2:
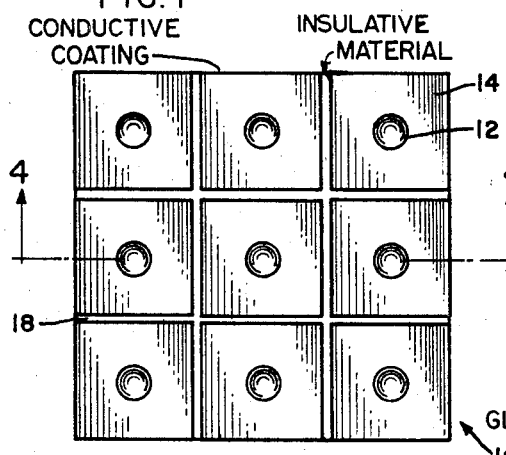
Figure 3:
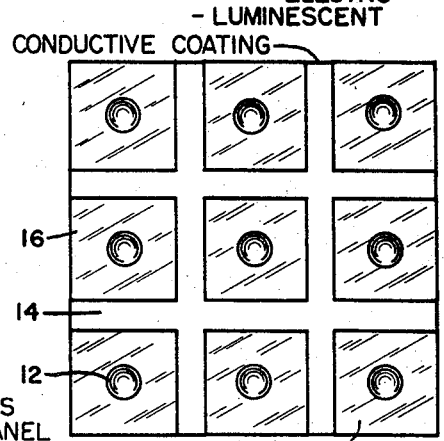
Figure 7:
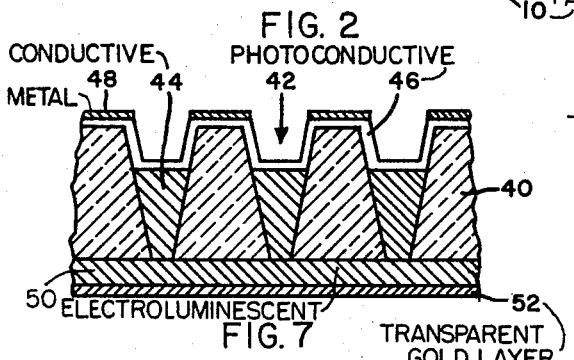
Figure 5:
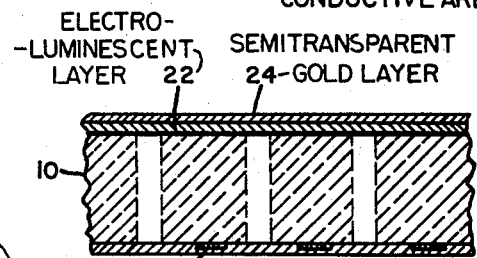
Figure 8:
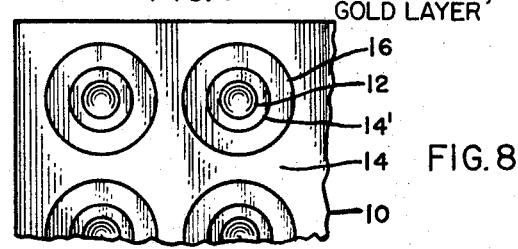

Other objects and many of the attendant advantages of this invention will be readily appreciated as the same becomes better understood by reference to the following detailed description when considered in connection with the accompanying drawings wherein:

FIG. 1 illustrates the basic circuit of light intensifiers;
FIG. 2 is a top plan view of a photoconductive-electroluminescent panel utilized in the invention;
FIG. 3 is a bottom plan view of the panel of FIG. 2;
FIG. 4 is a section taken on line 4—4 of FIG. 2;
FIG. 5 is a side elevation of a solid state image intensifier panel utilizing the invention;
FIG. 6 is a side elevation of another form of panel utilizing the invention;
FIG. 7 is a side elevation of another form of panel utilizing the invention; and
FIG. 8 is a modified form of the invention illustrated in FIGS. 2–4.

The fundamental principle of the photoconductive-electroluminescent light intensifier or image intensifier is well known. FIG. 1 illustrates this principle for one element. If the dark resistance of the photoconductive-electroluminescent cell is high, and the capacitance ratio $p = C_2/C_1$ is high. At zero light input the impedance ratio of the photoconductive cell to the electroluminescent cell is high and the voltage distribution is such that the electroluminescent cell has very low voltage; therefore the light output is very low. When the input light intensity L increases, the impedance of the photoconductive cell decreases, the voltage of the electroluminescent cell increases, and the light output B increases. If the appropriate impedance conditions are satisfied, the brightness of the electroluminescent cell can be higher than the input light intensity: $B/L > 1$, and light amplification results.

It has been found that in utilizing a Fotoform glass plate, with a mosaic of regularly spaced holes, an ideal construction of solid state image intensifiers is possible. It permits the separation of the photoconductive and electroluminescent layers and hence photoconductive elements with lateral electrodes can be used. These lateral cells have the necessary low capacitance, and the impedance relation between the corresponding photoconductive and electroluminescent elements easily can be satisfied. The image intensifier panel in this construction has a mosaic structure, according to the hole pattern. Around every hole there is a photoconductive cell on one side of the plate, and a corresponding electroluminescent cell on the other side. The corresponding cells are connected in series through the holes. Using opaque Fotoform glass no other means are needed for the elimination of light feedback.

Referring to FIGS. 2–4, the Fotoform glass panel 10 is illustrated diagrammatically. The substrate glass panel 10 is provided with the holes 12 extending therethrough in order to connect the later applied electroluminescent and photoconductive elements. In this manner, each material (photoconductive and electroluminescent) is applied on a different side of the glass panel and is thereby separate from the other. The conductive mosaic system of the panel is attained by coating the glass substrate completely with a conductive film such as tin oxide and etching out an appropriate electrode system on both sides of the panel by the well known photographic-chemical etching method using Kodak Metal Etch Resist (KMER). The electrode pattern for the electroluminescent elements to be provided on the upper surface of the panel 10 is shown in FIG. 2, where the large square shaped electrode 14 is in contact with the conductive hole 12 and is formed around every hole. The elementary electrodes are separated by the narrow insulating space 18. On the bottom surface of the panel, the electrode system of FIG. 3 is etched out for the photoconductive layer and is a non-conductive square 16, as shown, or may be in the form of a round area around each conductive hole 12. The conductive hole serves as an individual electrode and the continuous conductive coating 14 serves as the common electrode to all photoconductive elements.

After the panel 10 has been prepared, the photoconductive layer 20 is evaporated on the plate 10, as is illustrated in FIG. 5. The photoconductive layer may be CdS which has been evaporated under a high vacuum, and then sensitized by $CdCl_2$ and $CuCl_2$ diffusion at about 500° C. The electroluminescent layer 22 of plastic embedded ZnS phosphor powder is sprayed on the other side of the Fotoform glass material, after which a semi-transparent gold electrode layer 24 is evaporated under a high vacuum on top of the electroluminescent layer 22.

Another form of the invention is illustrated in FIG. 6. In this construction, a thin sheet of dark Fotoform glass 26 with large round or square holes is used. This sheet of glass is not coated with a conductive layer. An electroluminescent layer 28, embedded in glass or plastic, is sealed to a glass base 30 having a thin tin oxide coating 32. The Fotoform glass 26 is then placed on the electroluminescent layer 28 and is sealed to it. A non-transparent metal layer 34 is evaporated under high vacuum on the electroluminescent layer 28 through the holes 36 and on the upper face of the Fotoform glass, but not on the side walls of the holes 36. This is important as it is desired to have lateral conduction in the photoconductor layer. The side walls of the hole form the gap where the current will flow from the upper electrode to the lower electrode through the photoconductive layer. If the hole 36 were coated conductively on the side walls as well, the current would flow through this layer and would short the photoconductive layer. A photoconductive layer 38 is evaporated on the top of the metal electrodes 34 and on the side walls of the holes 36. The photoconductive layer is then sensitized, as described above.

The construction of the intensifier panel may be carried out in another manner, as is illustrated in FIG. 7. The Fotoform glass 40 is generally similar to the glass 26, except that the holes 42 may be tapered. These holes are partially filled with a conductive material 44, after which the photoconductive film layer 46 is evaporated on the open surface. After sensitizing the photoconductive layer, the top of the Fotoform glass is coated with a metal layer 48, none of it going into the holes 42. An electroluminescent layer 50 is sprayed on the bottom side and a semi-transparent layer of gold film 52 is evaporated on the electroluminescent layer.

The most difficult step in the forms described in FIGS. 6 and 7 is coating the holes with the photoconductive material and sensitizing it. This is carried out effectively, however, by placing the Fotoform glass at an angle to and turning it around the direction of evaporation.

Highly sensitive evaporated CdS layers can be prepared on soft glass bases by thermal diffusion of appropriate impurities onto the pure evaporated layer of CdS. Cells which are made on soft glass bases give a layer resistance of a few megohms per square at one foot candle illumination and also have a nearly linear current against light intensity characteristics around this illumination. When cells are similarly prepared on Fotoform substrates, they show more than hundred times higher resistivity at one foot candle illumination, and the current-light intensity curve is superlinear (nearly quadratic). This resistance of the photoconductive cell is too high, and results in a very low gain of the image intensifier. On the other hand, the superlinearity mentioned above gives rise to a too contrasting output image.

The high resistance and the high slope of the current-light intensity curve are caused by the high lithium content of the Fotoform glass. The lithium in CdS creates acceptor centers and it was experimentally found that one can compensate for this by introducing donor centers with calcium or magnesium impurities.

As an example, the following sensitizing mixtures can be used for introducing the necessary impurities into the pure CdS film:

|  | G. |
|---|---|
| CdS | 100.00 |
| $CdCl_2$ | 0.85 |
| $CuCl_2$ | 0.72 |
| $NiCl_2+6H_2O$ | 0.44 |
| $FeCl_2+4H_2O$ | 0.03 |
| PbCl | 0.03 |
| $CaCl_2$ | 1.00 |

The CdS film evaporated on the Fotoform substrate is covered with the above sensitizing mixture in a thickness of 1 mm. or less and is heated in air at 550° C. for about 45 minutes. After cooling the substrate, the powder is brushed off, the panel is rinsed and is boiled in deionized water. An aging in a 150° C. oven for a few hours finishes the sensitization of the CdS film.

The objective, of the invention, to provide a solid state image intensifier which overcomes the disadvantages of the sandwich panel has been obtained. The Fotoform glass provides an ideal substrate. As another alternative, it is possible to construct a mosaic of regularly spaced holes on a thin sheet of another regular glass plate by chemical etching. In this construction the photoconductor and electroluminescent layers are separated and photoconductor elements with lateral electrodes can be used. Connection is in series through the holes.

The construction of FIGS. 2-4 could be modified so that the electrode pattern on the photoconductor layer side of the Fotoform glass would be modified to provide a conductive circle around the holes 12. This would reduce variations in sensitivities of the individual photocells. This form of the inventive concept is shown in FIG. 8 and the conductive electrode 14' is circular and is concentric around each hole 12 of the Fotoform glass 10. If desired, the inside of the common electrode 14 could also be circular in shape and could be concentric with the electrode 14'. This is also shown in the figure. Variations in FIG. 7 are also within the scope of the invention. For example, the holes 42 could be filled with indium, or with conductive epoxy resin, after the photoconductor layer had been prepared.

Obviously many modifications and variations of the present invention are possible in the light of the above teachings. It is therefore to be understood that within the scope of the appended claims the invention may be practiced otherwise than as specifically described.

What is claimed is:

1. A solid state image intensifier panel comprising, a Fotoform glass panel,
   means comprising a plurality of spaced apart holes in said glass,
   means comprising a conductive coating extending across the upper and lower surfaces of the glass panel,
   said conductive coating extending through said holes,
   the upper surface having a conductive area around each hole and the lower surface having a conductive grid with each respective hole enclosed by a respective square of said grid,
   means comprising photoconductor material covering said lower surface,
   means comprising electroluminescent material covering said upper surface, and
   means comprising a gold layer on said electroluminescent material,
   whereby the glass panel acts as a separating means for the two layers of the image intensifier, and the conductive coating extending through said holes connects corresponding photoconductive and electroluminescent elements.

2. A solid state image intensifier panel comprising, a Fotoform glass panel,
   said panel having a plurality of holes therethrough,
   means comprising a metal coating on the upper surface of said panel and at the bottom of said holes,
   the sides of said holes being free of coating, means comprising a photoconductive layer on said upper surface and in said holes, means comprising an electroluminescent layer on the lower surface of said Fotoform glass panel, whereby the glass panel acts as a separating means for the two layers of the image intensifier, and connects together corresponding photoconductive and electroluminescent elements.

3. A solid state image intensifier panel comprising, a Fotoform glass panel, said panel having a plurality of holes therethrough, means comprising conductive material in said holes, means comprising a photoconductive layer on the upper surface of the panel and on the conductive material, means comprising a metal layer on said photoconductive layer, said metal layer being perforated with a perforation surrounding each respective hole, said perforation being larger than said hole, and means comprising an electroluminescent layer on the lower surface of said panel, whereby the glass panel acts as a separating means for the two layers of the image intensifier, and connects corresponding photoconductive and electroluminescent elements.

4. The process of improving a solid state image intensifier comprising the steps of:

coating a perforated separating material on each side with current conducting material, coating the walls of the perforations in said perforated material with current conductive material, etching the current conductive coating on a first side of said perforated separating material to form a conductive area around each said hole with an insulating gridwork of nonconducting spacing separating the respective areas, etching said current conductive coating on a second side of said perforated separating material to form a nonconductive space around each respective hole with a gridwork of said current conductive coating separating the respective nonconductive spaces around said holes, coating said first side of said perforated separating material with a photoconductive material, coating said second side of said perforated separating material with an electroluminescent material, and coating said electroluminescent material with a semi-transparent gold conductor material.

5. The process of improving a solid state image intensifier comprising the steps of:

coating a substrate material with metal, placing a layer of electroluminescent material on said metal, placing a layer of glass on said electroluminescent material, making a plurality of holes in said glass, coating the bottoms of said holes and the tops of the ridges between the said holes with nontransparent metal, and coating said nontransparent metal and the sides of said holes with photoconductive material.

6. The process of improving a solid state image intensifier comprising the steps of:

making a plurality of tapered holes in a substrate material, said holes being larger at the top than at the bottom, partially filling said holes with conductive material, coating the top of said conductive material in said holes, the sides of said holes above said conductive material, and the tops of the area between said holes with a photoconductive coating, coating the photoconductive coating on the tops of the area between said holes with metal, coating the bottom of said substrate material with electroluminescent material, and coating said electroluminescent material with a thin layer of semi-transparent gold.

References Cited

UNITED STATES PATENTS

| | | | |
|---|---|---|---|
| 2,920,232 | 1/1960 | Evans | 250—213 X |
| 2,973,436 | 2/1961 | Koury | 250—213 |
| 2,975,291 | 3/1961 | Loebner et al. | 250—213 |
| 2,999,941 | 9/1961 | Klasens et al. | 250—213 |
| 3,002,102 | 9/1961 | Palmer | 250—213 |
| 3,015,036 | 12/1961 | Butler | 250—213 |
| 3,059,118 | 10/1962 | Koury | 250—213 |
| 3,117,232 | 1/1964 | Diemer et al. | 250—213 |
| 3,204,106 | 8/1965 | Murr et al. | 250—213 |

RALPH G. NILSON, *Primary Examiner.*

M. A. LEAVITT, *Assistant Examiner.*